(12) United States Patent
Lee

(10) Patent No.: US 7,430,368 B2
(45) Date of Patent: Sep. 30, 2008

(54) ZOOM LENS ASSEMBLY CAPABLE OF MACRO PHOTOGRAPHY

(75) Inventor: Chun-yen Lee, Taichung (TW)

(73) Assignee: Asia Optical Co., Inc, Taichung (TW)

( * ) Notice: Subject to any disclaimer, the term of this patent is extended or adjusted under 35 U.S.C. 154(b) by 530 days.

(21) Appl. No.: 11/176,288

(22) Filed: Jul. 8, 2005

(65) Prior Publication Data
US 2007/0009246 A1    Jan. 11, 2007

(30) Foreign Application Priority Data
Jul. 9, 2004    (TW) ............................... 93120560 A

(51) Int. Cl.
*G03B 17/00*    (2006.01)
(52) U.S. Cl. ............................. 396/76; 396/77; 396/79; 396/83; 396/103; 396/133; 359/705; 359/706; 359/819; 348/240.99; 348/373; 348/374
(58) Field of Classification Search .................. 396/76, 396/77, 79, 83, 103, 132, 133; 359/705, 359/706, 819, 693; 348/240.99, 340, 335, 348/373–375
See application file for complete search history.

(56) References Cited

U.S. PATENT DOCUMENTS

| 4,097,124 | A | * | 6/1978 | Watanabe et al. ........... 359/705 |
| 4,448,496 | A | | 5/1984 | Isobe et al. |
| 4,720,182 | A | | 1/1988 | Imanari et al. |
| 4,806,000 | A | | 2/1989 | Shiokama et al. |
| 5,768,649 | A | * | 6/1998 | Pearson ...................... 396/529 |
| 6,778,333 | B2 | | 8/2004 | Takeshita et al. |
| 2001/0015859 | A1 | * | 8/2001 | Nomura et al. ............. 359/701 |
| 2004/0165877 | A1 | * | 8/2004 | Hsiao .......................... 396/85 |
| 2004/0263999 | A1 | | 12/2004 | Raymond et al. |
| 2006/0007351 | A1 | * | 1/2006 | Choi et al. .................. 348/374 |
| 2007/0177279 | A1 | * | 8/2007 | Cho et al. ................... 359/692 |

* cited by examiner

*Primary Examiner*—W. B. Perkey
*Assistant Examiner*—Michael A Strieb

(57) ABSTRACT

A zoom lens assembly includes an optical system forming an optical axis and having at least one lens group, a base member (1), a macro ring member (2) rotatably engaged with the base member for accomplishing both zooming and focusing operations, a lens holder (3) received in the macro ring member and having the at least one lens group received therein, a resilient member (4) compressively engaged with the lens holder, and an interengaging means (13, 21; 16, 25) provided between the macro ring member and the base member. The macro ring member has a driving member (22, 27) disposed thereon for manual manipulating. When the driving member is manipulated, the macro ring member is rotated and moved along the optical axis relative to the base member by the action of the interengaging means, and thus the focal length of the optical system is varied for effecting both normal photography and macro photography.

20 Claims, 10 Drawing Sheets

FIG. 2
(PRIOR ART)

ZOOM LENS ASSEMBLY CAPABLE OF MACRO PHOTOGRAPHY

BACKGROUND OF THE INVENTION

1. Field of the Invention

The present invention relates to a zoom lens assembly capable of effecting both macro (close-up) photography and normal photography, and particularly relates to such a zoom lens assembly of a simple structure.

2. Description of Prior Art

It is well known that, due to the limited space, photographing lenses used in camera phones have dimensions much smaller than those in photographic cameras, video cameras and digital cameras. To obtain the best image quality, camera phones generally employ fixed focal length lenses. However, since the focal length is fixed rather than adjustable, the focus range for such fixed focal length lenses is limited, and thus it would be unavailable to take the scenes out of the focus range or take them ambiguously.

To address the above problem, camera phones with zoom lens for effecting macro photography have been designed. Various focusing devices of zoom lenses capable of focusing to a macro photographing distance range just beyond the close distance position in a normal photographing distance range which enables zoom magnification change have been proposed and are already known. These focusing devices are disclosed in U.S. Pat. Nos. 4,720,182; 4,806,000; 6,778,333 and U.S. Pat. Pub. No. 20040263999.

A zoom lens in which zoom magnification change and focusing from the normal photography area to the macro area can be accomplished by an operation member is also known, for example, from U.S. Pat. No. 4,448,496. In the above-described prior art, there is shown a zoom lens in which focusing in the normal photography area is accomplished by rotating an operating member and subsequently focusing in the macro area can be accomplished by further rotation of the operating member beyond the normal photography area. However, the mechanical operating device for the above-described conventional zoom lens is rather complicate and thus occupies a large space, which deviates from the miniaturization trend of modern consuming products such as camera phones.

The components of a conventional zoom lens assembly with macro photography capabilities are illustrated in FIGS. 1-2. The conventional zoom lens assembly includes a base 6, a macro ring 7, a focus ring 8, a lens holder 9, a helicoidal spring 10, an outer cap 11, a pair of bolts 12 and an image sensing element 13. The base 6 has an annular socket 61 formed at a central portion thereof for supporting the macro ring 7 therearound and for receiving the focus ring 8 and the lens holder 9 therein. A pair of opposing guide posts 62 and a pair of opposing retention portions 63 are formed at corners of the base 6. Each retention portion 63 defines a threaded hole 65 therein for engaging with the bolt 12, thereby assembling the components into a unit. An opening 66 is defined in the bottom of the base 6 in communication with the annular socket 61 chamber. Three inverted U-shaped supporters 64 are arranged at equal intervals around the outer periphery of the annular socket 61. The macro ring 7 has a bottom surface 72, three projections 71 downwardly projecting from the bottom surface 72, and a transition slope 74 connecting the bottom of each projection 71 with the bottom surface 72. A driving arm 73 projects outwardly from the outer periphery of the macro ring 7. The focus ring 8 includes a barrel 81 for receiving the lens holder 9 therein, a top rim 82 having an outer diameter larger than that of the barrel 81, and a pair of opposite guide portions 83 outwardly projecting from the top rim 82 and each defining a semicircular guide slot 84 therethrough. The image sensing element 13 is a CCD (Charge-Coupled Device) sensor or a CMOS (Complimentary Metal-Oxide Semiconductor) sensor.

A side view of the conventional zoom lens assembly in an assembled state is shown in FIGS. 3 and 4. It should be noted that, for facilitating description of the operation process of the mechanical operating device of the conventional zoom lens assembly, the helicoidal spring 10, the outer cover 11, the bolts 12 and the image sensing element 13 are omitted from FIGS. 3 and 4. As shown in FIGS. 3 and 4, the macro ring 7 is mounted over the annular socket 61 of the base 6. In a normal photographing position as shown in FIG. 3, the bottom surface 72 of the macro ring 7 is supported on the supporters 64 of the base 6. The focus ring 8 with the lens holder 9 received therein is inserted into the annular socket 61 with the rim 82 thereof abutting against the top edge of the macro ring 7. The semicircular guide slots 84 of the focus ring 8 receive corresponding guide posts 62 of the base 6 therein so as to allow upward and downward movements of the focus ring 8. When macro photography is desired, the driving arm 73 of the macro ring 7 is rotated leftwardly as viewed from FIG. 3 from the normal photographing position of FIG. 3 to the macro photographing position of FIG. 4, where the bottoms of the projections 71 of the macro ring 7 are supported on the supporters 64 of the base 6. That is, the macro ring 7 rotates in a certain angle whereby the slope 74 slides over the supporter 64 and then the bottom of the projection 71 engages with the supporter 64. As a result, the focus ring 8 coupled to the macro ring 7 and the lens holder 9 received in the focus ring 8 are both upwardly moved a certain distance, whereby focus length adjustment is achieved and thus macro photography is effected. As illustrated in FIG. 5, in the case of a fixed position of the image plane "M" (i.e., where the image sensing element 13 is arranged) of the optical system, when the object to be photographed is at a normal distance, the lens holder 9 is located at position "L", and a clear image A'-B' of such an object A-B is formed on the image plane "M". When the object to be photographed is at a close-up distance less than a normal object distance, the lens holder 9 is moved from the position "L" to position "L1", and a clear image A1'-B1' of such an object A1-B1 is also formed on the image plane "M".

Although the conventional zoom lens assembly as described above is capable of macro photography by the adoption of a mechanical adjustment device, it requires a number of components and thus is complex in configuration, which results in increased costs and bulky configuration of the zoom lens assembly and thus the photographic device applying such a zoom lens assembly. This deviates from the miniaturization trend of modern consuming products and thus restricts wide application of such a zoom lens assembly.

Further, in the conventional zoom lens assembly as described above, there are provided both a focus ring for the normal photography and a macro ring for the macro photography (an operating member for zoom magnification change). Therefore, when photography is to be continuously effected from the normal photography area to the macro photography area or from the macro photography area to the normal photography area, the two rings must be operated cooperatively. Accordingly, the operation for focusing is complicated and quick focusing cannot be accomplished. In addition, the focusing is discontinuous and this leads to the possibility of missing the opportunity to photograph an object in motion whose distance gradually changes.

SUMMARY OF THE INVENTION

Accordingly, one object of the present invention is to provide a compact zoom lens assembly capable of effecting both macro (close-up) photography and normal photography.

Another object of the present invention is to provide a zoom lens assembly provided with a macro photography change-over device in which zooming and focusing from the normal photography area to the macro photography area can be accomplished by an operating member.

To achieve the above objects, a zoom lens assembly in accordance with the present invention includes an optical system defining an optical axis, a base member, a macro operating ring member rotatably engaged with the base member for both zooming and focusing operations, a lens holder received in the macro operating ring member and adapted for receiving at least one lens group therein, and a resilient member compressively engaged with the lens holder. An interengaging means is disposed between the macro operating ring member and the base member. The macro operating ring member is rotated and moved a certain distance by the action of the interengaging means along the optical axis relative to the base member. A driving portion is provided on the macro operating ring member for effecting rotation of the macro operating ring member. In this way, focal length adjustment of the optical system can be accomplished, and thus both normal photography and macro photography can be effected.

Accordingly to one embodiment of the present invention, the base member has an annular socket with a cam slot defined in the outer periphery thereof. The cam slot includes a first slot portion, and a second slot portion offset from the first slot portion in the optical axis direction. An outwardly projecting cam pin is correspondingly formed on the macro operating ring member for being received in the cam slot of the base member. The cam pin is movable between the first and second slot portions for focal length adjustment.

Accordingly to another embodiment of the present invention, the base member has an annular socket with female threads formed on an inner diameter side thereof. The macro operating ring member has male threads formed on the outer periphery thereof, and an outwardly projecting driving pin for effecting rotation. The male and female threads constitute an interengaging means between the base member and the macro operating ring member, by the action of which focal length adjustment is accomplished.

Accordingly to a further embodiment of the present invention, the base member has an annular socket with male threads formed on an inner diameter side thereof. The macro operating ring member has male threads formed on the outer periphery thereof, and a large-dimensioned upper flange for effecting rotation. The male and female threads constitute an interengaging means between the base member and the macro operating ring member, by the action of which focal length adjustment is accomplished.

BRIEF DESCRIPTION OF THE DRAWINGS

The present invention may best be understood through the following description with reference to the accompanying drawings, in which:

Figure 2:
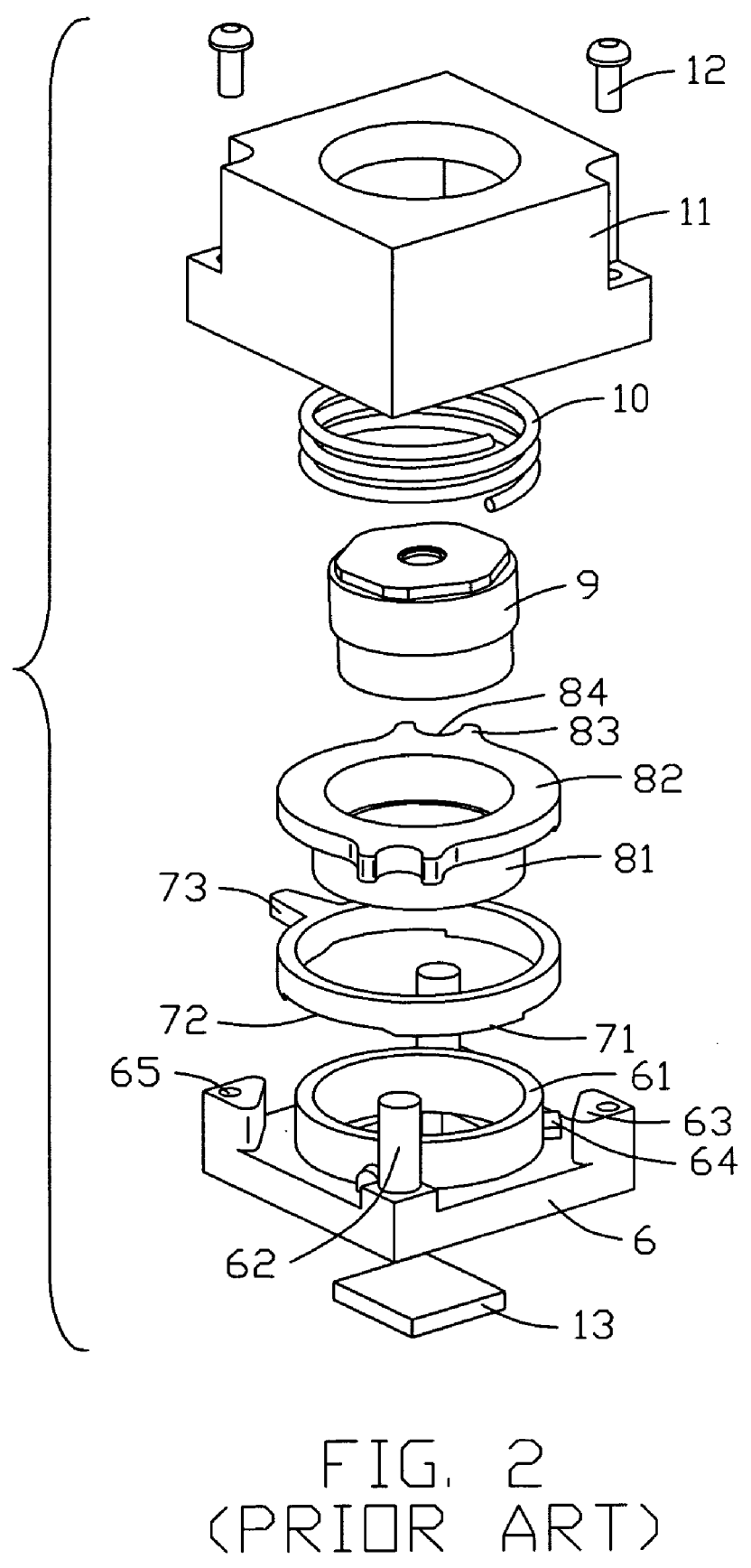

FIG. 2 is a view similar to FIG. 1, but viewed from a different angle;

DETAILED DESCRIPTION OF THE INVENTION

Figure 1:
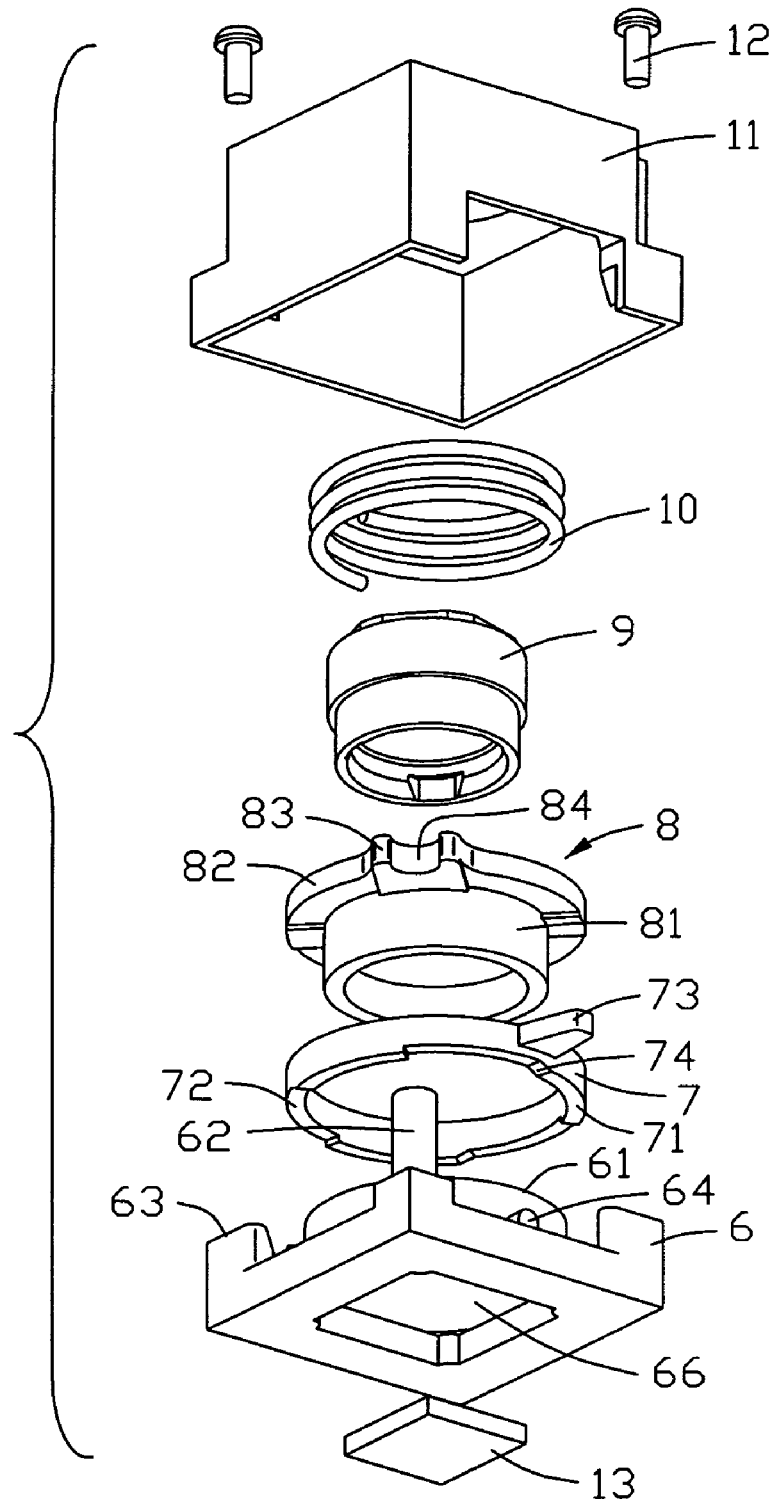
FIG. 1 is an exploded, perspective view of a conventional zoom lens assembly.
Figure 3:
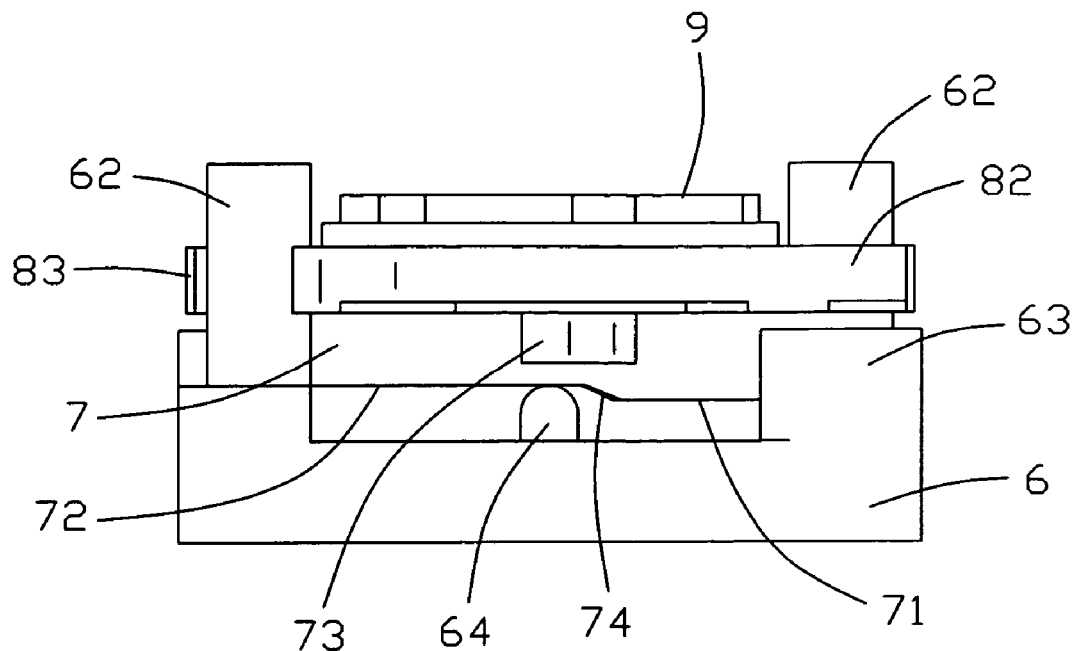
FIG. 3 is a side view illustrating a normal photographing state of the conventional zoom lens assembly, the conventional zoom lens assembly being in an assembled state but with a spring, an outer cap and a pair of bolts thereof removed for simplicity.
Figure 4:
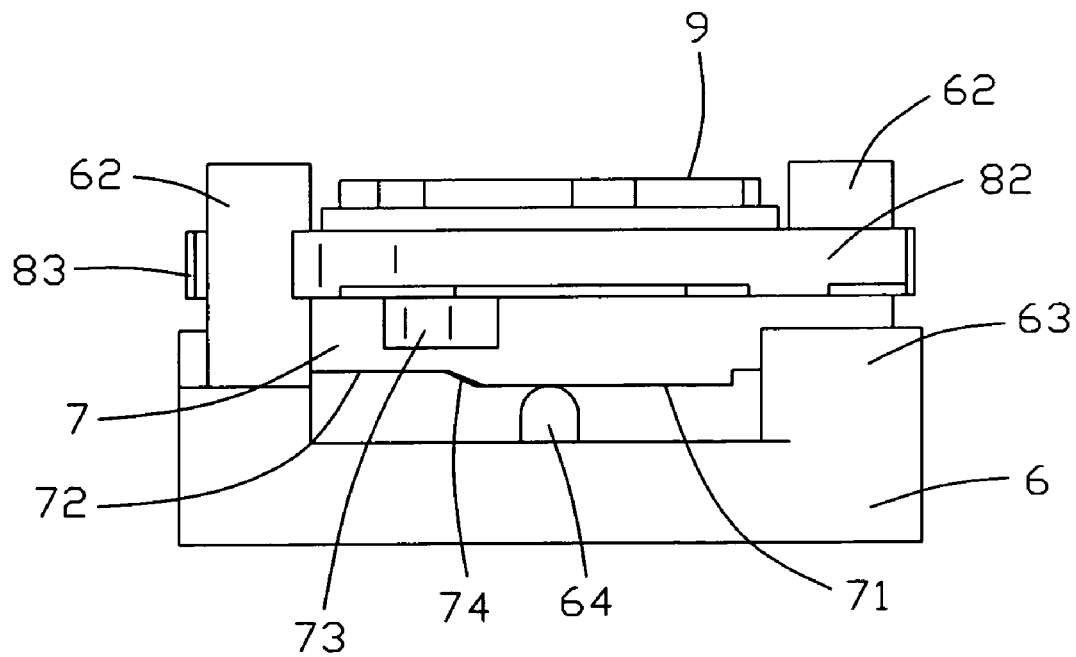
FIG. 4 is a side view illustrating a macro photographing state of the conventional zoom lens assembly, the conventional zoom lens assembly being in an assembled state but with a spring, an outer cap and a pair of bolts thereof removed for simplicity.
Figure 5:
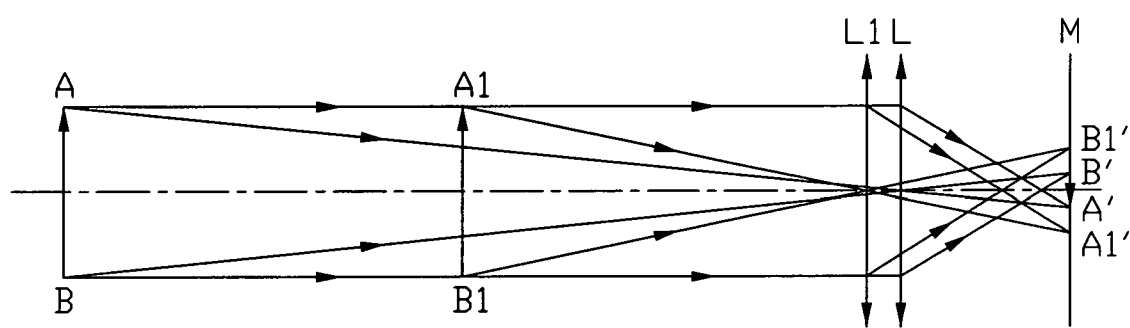
FIG. 5 is a schematic view provided for explaining the focal length adjustment in the normal photography position and the macro photography position.
Figure 6:
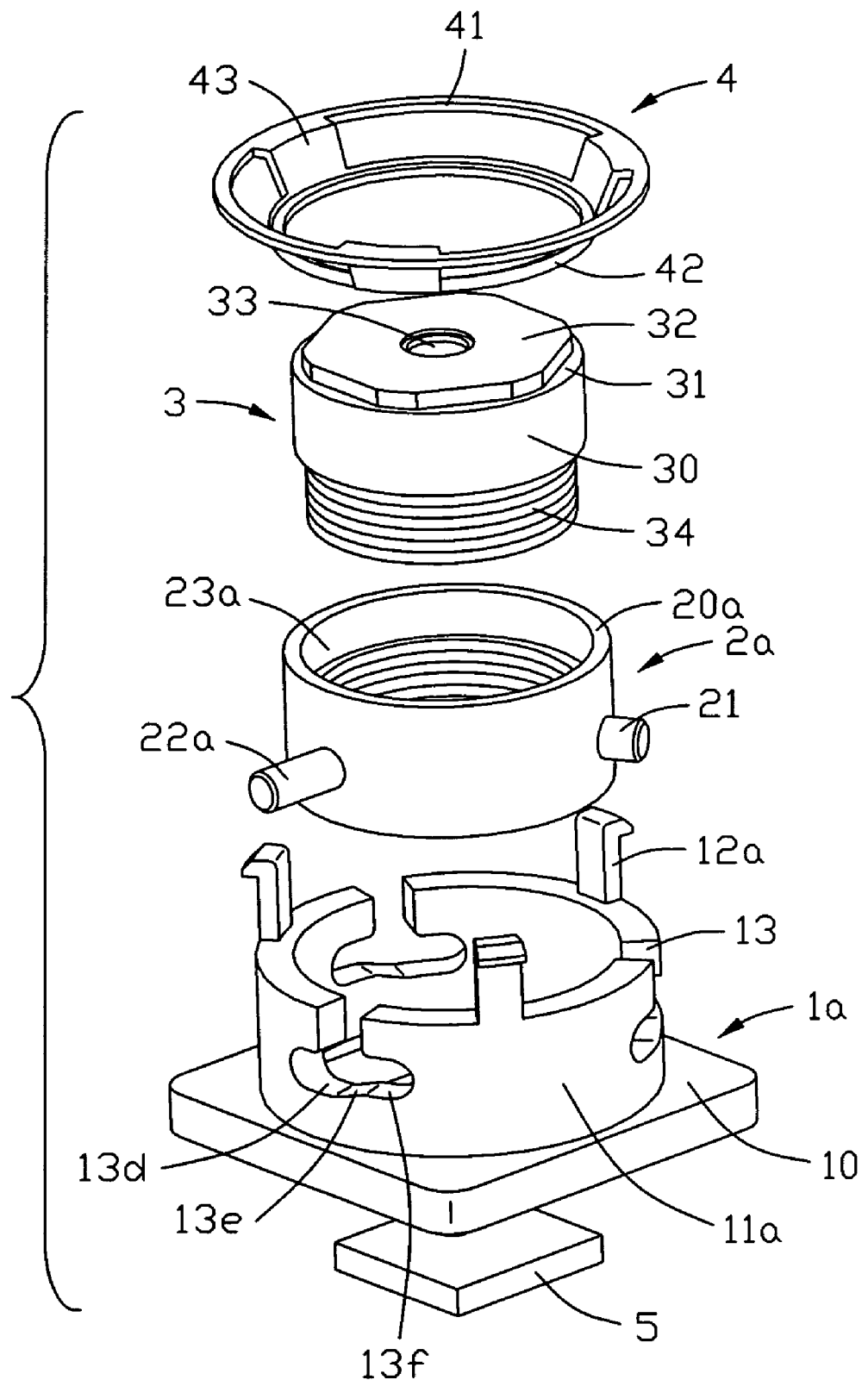
FIG. 6 is an exploded, perspective view of a zoom lens assembly in accordance with a first embodiment of the present invention.
Figure 7:
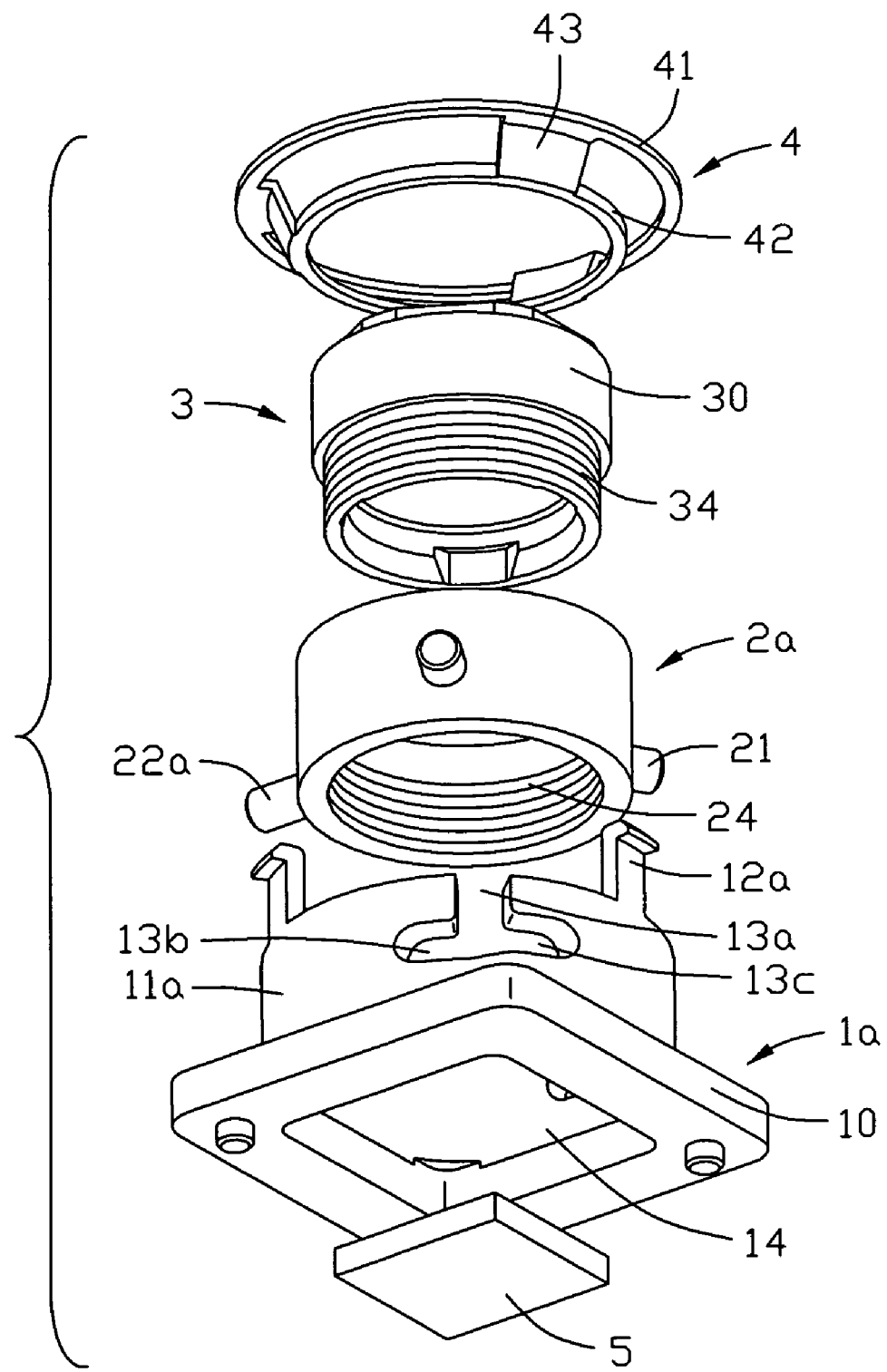
FIG. 7 is a view similar to FIG. 6, but viewed from a different angle.

Referring to FIGS. 6 and 7, a zoom lens assembly in accordance with a first embodiment of the present invention includes a base member 1a, a macro operating ring member 2a, a lens holder 3 and a resilient member 4. The lens holder 3 receives at least one lens group therein. The at least one lens group and an image sensor 5, such as a CCD sensor or a CMOS sensor, constitute an optical system defining an optical axis. The base member 1a has a rectangular base plate 10 and an annular socket 11a integrally formed on the base plate 10. The annular socket 11a is preferably in the form of a cylinder, although other forms may also be taken. An opening 14 is defined in the base plate 10 in communication with the annular socket 11a chamber for receiving the image sensor 5 therein. Three latch arms 12a project upwardly from a top side of the annular socket 11a at equal intervals. A cam slot 13 is defined in the outer periphery of the annular socket 11a between every two adjacent latch arms 12a. The cam slot 13 includes a guide portion 13a extending in the optical axis direction, and first and second opposite slot portions 13b, 13c transverse to the guide portion 13a. The first slot portion 13b provides a first flat surface 13d at the bottom side thereof, and the second slot portion 13c provides a second flat surface 13f at the bottom side thereof. The first and second flat surfaces 13d and 13f are connected with each other via an inclined surface 13e right below the guide portion 13a. Accordingly, the first and second flat surfaces 13d and 13f are offset from each other in the optical axis direction. The second flat surface 13f is at a level higher than that of the first flat surface 13d.

The macro operating ring member 2a includes a hollow cylindrical body 20a, and three cam pins 21 extending from the outer periphery of the body 20a at equal intervals adjacent to the bottom of the body 20a. One of the three cam pins 21 projects a further distance to act as a driving pin 22a for facilitating handling. The body 20a includes a first receiving portion 23a, and a second receiving portion 24 having an inner diameter smaller than that of the first receiving portion 23a. The lens holder 3 is substantially in the form of a hollow cylinder, and includes a first hollow cylinder portion 30, a second hollow cylinder portion 34 having an outer diameter smaller than that of the first hollow cylinder portion 30, and a polygonal top portion 32 formed on an upper surface 31 of the first hollow cylinder portion 30. The second hollow cylinder portion 34 forms threads on the outer periphery thereof. A central aperture 33 is defined in the polygonal top portion 32 for allowing passage of the light that is then incident on the at least one lens groups received in the lens holder 3. The resilient element 4 is a belleville spring that includes a first ring 41, a second ring 42 having a diameter smaller than that of the first ring 41, and three connecting pieces 43 arranged at equal intervals connecting the first and second rings 41, 42.

Figure 8:
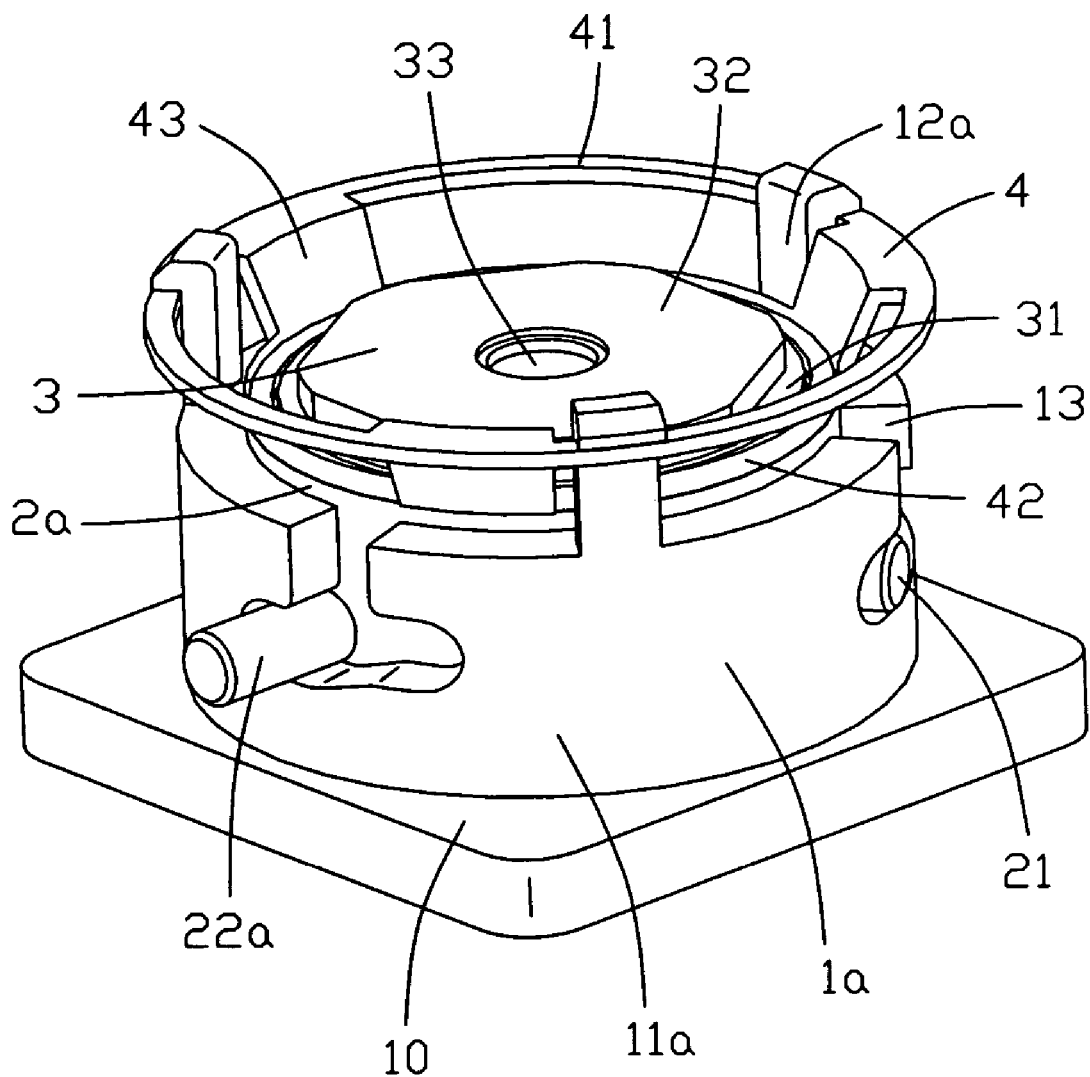
FIG. 8 is an assembled view of FIG. 6.

Also referring to FIG. 8, in assembly, the first and second hollow cylinder portions 30, 34 of the lens holder 3 are retentively received in the respective first and second receiving portions 23*a*, 24 of the macro operating ring member 2*a*. The macro operating ring member 2*a* is received into the annular socket 11*a* of the base member 1*a* with the cam pins 21, 22*a* sliding into the transverse portions of corresponding cam slots 13 via the guide portions 13*a*. The second ring 42 of the resilient member 4 abuts against the top side of the body 20*a* of the macro operating ring member 2*a*, and the first ring 41 is latched with the latch arms 12*a* of the base member 1*a*, whereby the resilient member 4 is compressed to exert a force on the lens holder 3 and the macro operating ring member 2*a*. Thus, free upward movement of the lens holder 3 and the macro operating ring member 2*a* along the optical axis is prevented.

Figure 9:
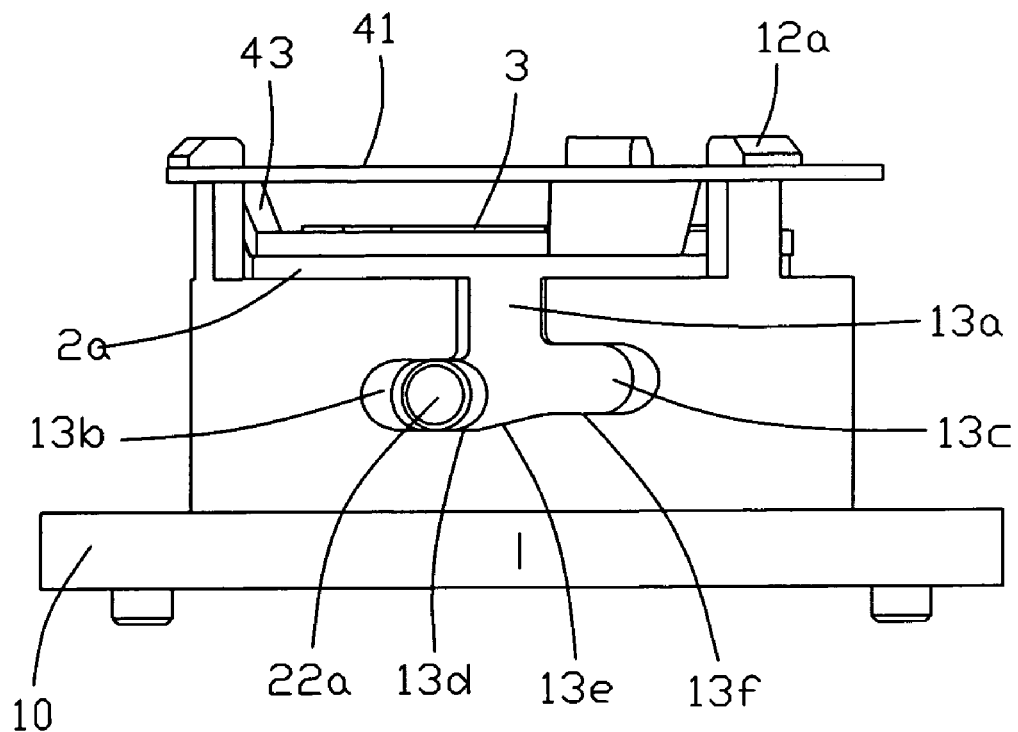
FIG. 9 is a side view showing the zoom lens assembly of FIG. 8 in a normal photography position.
Figure 10:
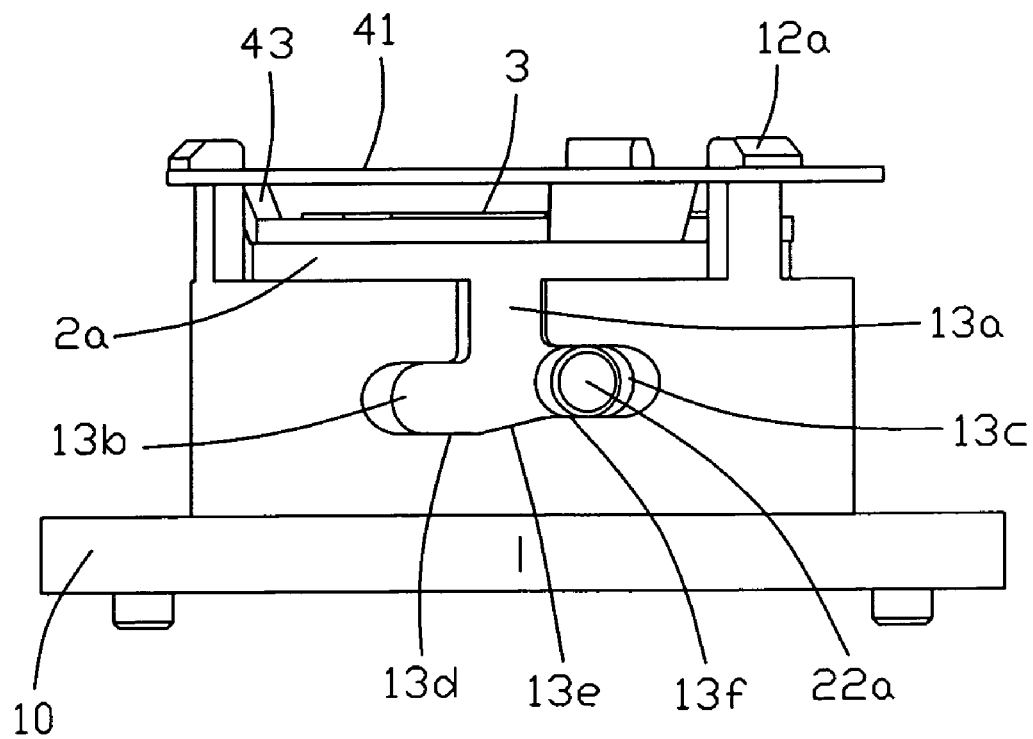
FIG. 10 is a side view showing the zoom lens assembly of FIG. 8 in a macro photography position.

Now referring to FIG. 9, when the object to be photographed is at a normal distance, the driving pin 22*a* of the macro operating ring member 2*a* is received in the first slot portion 13*b* of the cam slot 13 and engages with the first flat surface 13*d* of the first slot portion 13*b*. When the object to be photographed is at a macro (close-up) distance less than the normal distance, as shown in FIG. 10, the driving pin 22*a* of the macro operating ring member 2*a* is actuated to move from the first slot portion 13*b* to the second slot portion 13*c* at a higher level via the inclined surface 13*e*. The driving pin 22*a* engages with the second flat surface 13*f* of the second slot portion 13*c*. Since the first and second flat surfaces 13*d*, 13*f* of the cam slot 13 are offset from each other in the optical axis direction, the macro operating ring member 2*a* and the lens holder 3 received in the macro operating ring member 2*a* are thus upwardly moved a predetermined distance relative to the stationary base member 1*a* along the optical axis. That is, the cam pin 21, 22*a* of the macro operating ring member 2*a* and the corresponding cam slot 13 of the base member 1 constitute an interengaging means, by the action of which the macro operating ring member 2*a* is moved relative to the annular socket 11*a* of the base member 1*a*, whereby an axial movement of the macro operating ring member 2*a* and the lens holder 3 relative to the annular socket 11*a* is accomplished. In this manner, when the macro operating ring member 2*a* is rotated, the lens holder 3 with at least one lens group received therein is upwardly moved from the normal photography position of FIG. 9 to the macro photography position of FIG. 10 along the optical axis through the action of the interengaging means. In this way, the interengaging means drives the at least one lens group toward the object at a macro distance for adjusting the focal length. By the reverse operation, the lens holder 3 can be downwardly moved from the macro photography position to the normal photography position.

In the embodiment as described above, the three outwardly projecting cam pins 21, 22*a* formed on the movable macro operating ring member 2*a* are fitted into the respective cam slots 13 defined in the annular socket 11*a* of the fixed base member 1*a* to guide the movable macro operating ring member 2*a* along the optical axis. However, it should be understandable that, the cam slots may also be defined in the movable macro operating ring member 2*a*, while the cam pins that are engaged in the cam slots may be formed on an inner side of the annular socket 11*a* of the fixed base member 1*a*. The driving pin 22*a* remains on the macro operating ring member 2*a*.

Figure 11:
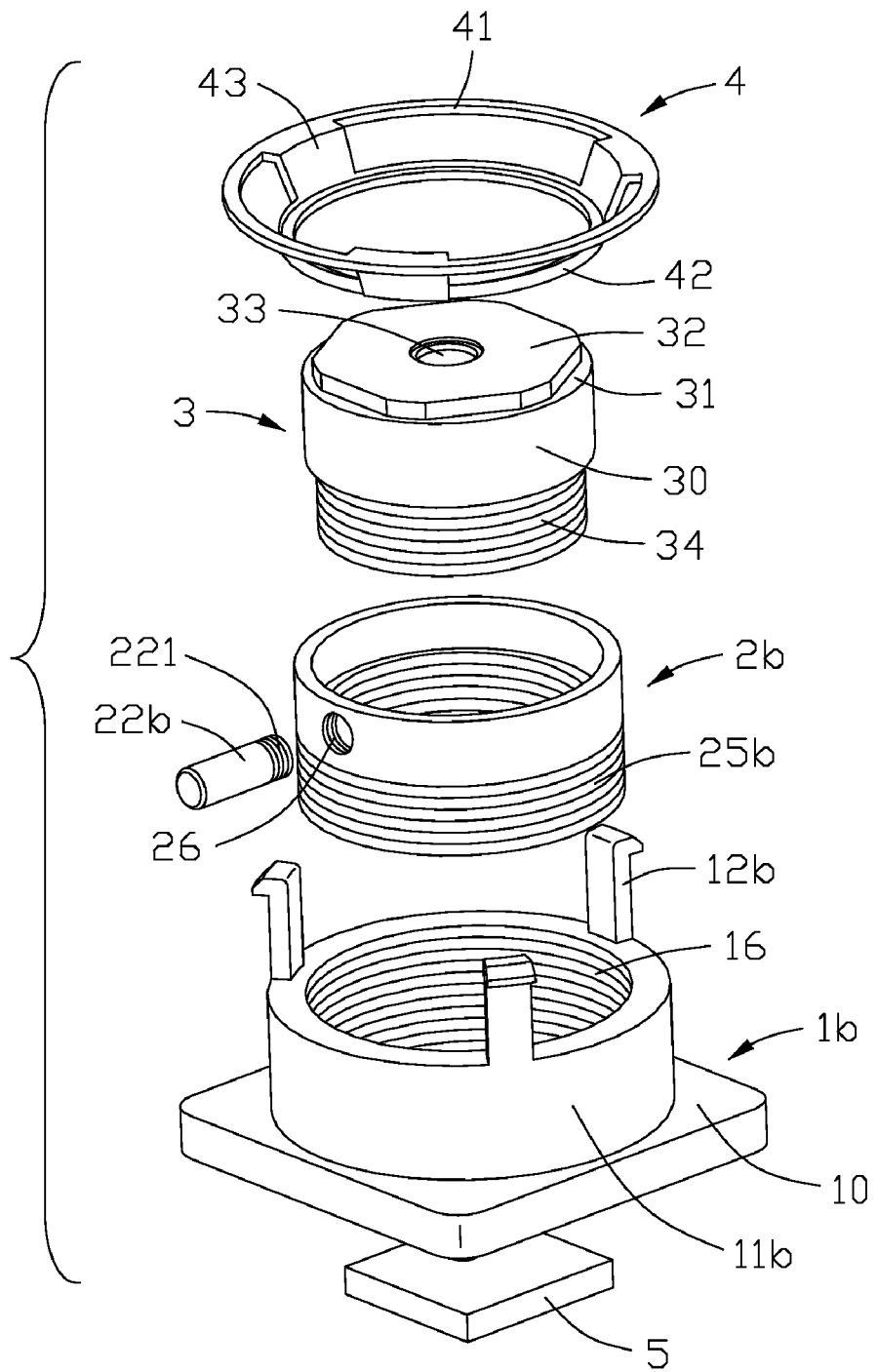
FIG. 11 is an exploded, perspective view of a zoom lens assembly in accordance with a second embodiment of the present invention.

A zoom lens assembly in accordance with a second embodiment of the present invention is shown in FIG. 11. In this embodiment, threads 16 formed on an inner diameter side of the annular socket 11*b* of the base member 1*b* replace the cam slots 13 in the first embodiment, and threads 25*b* formed on the outer periphery of the macro operating ring member 2*b* at a lower portion replace the cam pins 21 in the first embodiment. In addition, a threaded hole 26 is defined in the macro operating ring member 2*b*, and the driving pin 22*b* is formed with threads 221 at one end thereof for engaging with the threaded hole 26. The macro operating ring member 2*b* with the lens holder 3 received therein is received in the annular socket 11*b* of the base member 1*b* by the threaded engagement between the male threads 25*b* and the female threads 16. When the driving pin 22*b* is manipulated, the macro operating ring member 2*b* is rotated and may be upwardly moved a distance relative to the annular socket 11*b* along the optical axis by the action of the threads 16 and 25*b*. Thus, the focal length of the optical system is adjusted and macro photography is effected. In this embodiment, the female threads 16 on the annular socket 11*b* and the male threads 25*b* on the macro operating ring member 2*b* constitute the interengaging means, by the action of which axial movement of the macro operating ring member 2*b* and the lens holder 3 relative to the annular socket 11*b* is accomplished, and thus both normal photography and macro photograph can be effected.

Figure 12:
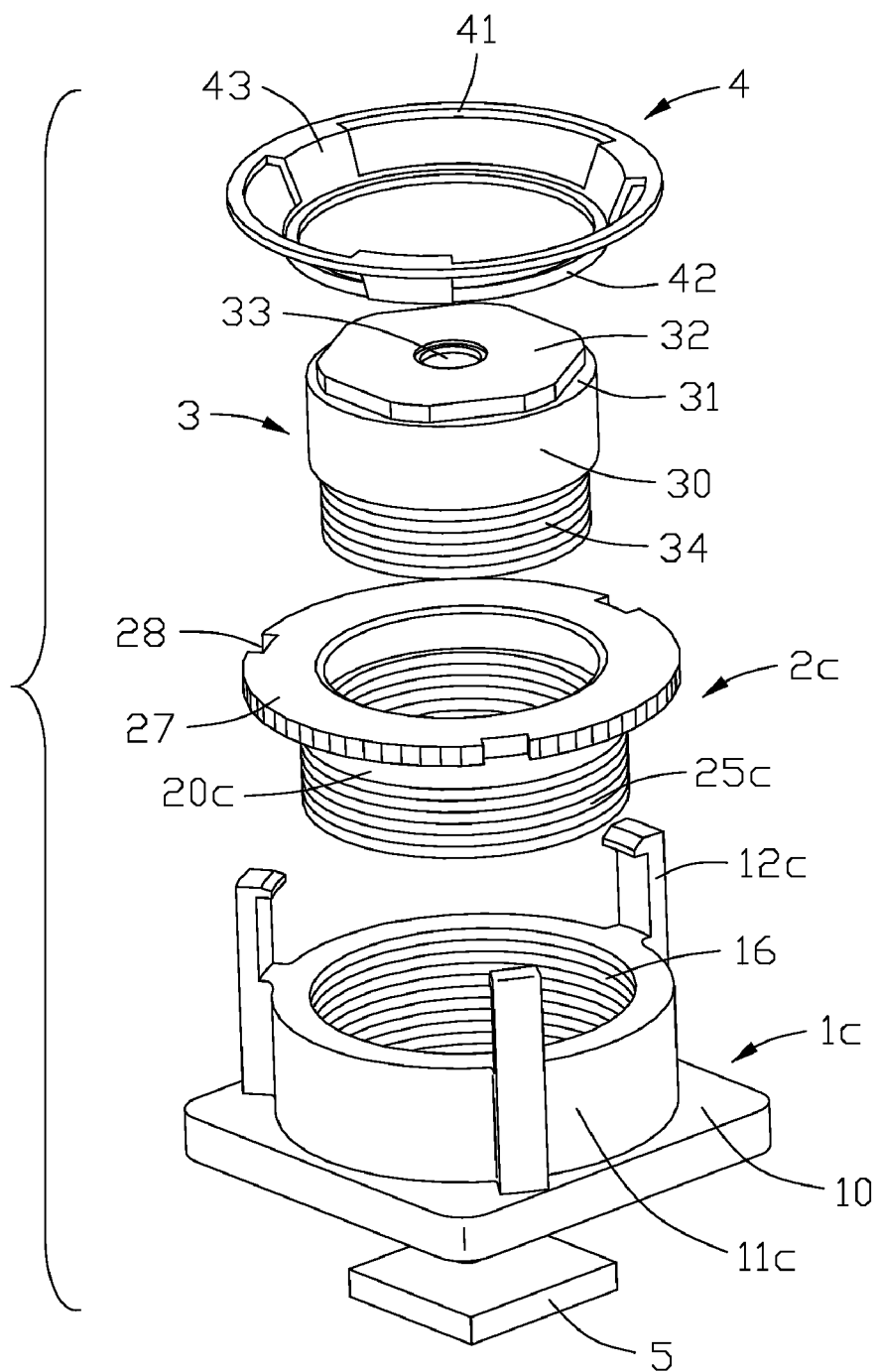
FIG. 12 is an exploded, perspective view of a zoom lens assembly in accordance with a third embodiment of the present invention.

A zoom lens assembly in accordance with a third embodiment of the present invention is shown in FIG. 12. This embodiment is different from the second embodiment in that an upper flange 27 replaces the threaded hole 26 and the driving pin 22*b* in the second embodiment, and three latch arms 12*c* each with an inward free end replace the three latch arms 12*a*, 12*b* each with an outward free end in the first and second embodiments. The three latch arms 12*c* are formed on the outer periphery of the annular socket 11*c* rather than on the top side of the annular socket 11 as in the first and second embodiments. This provides rotation space for the flange 27 that has an outer diameter larger than that of the body 20*c* of the macro operating ring member 2*c*. The flange 27 is rotatable in 360 degrees, whereby the focus range of the macro operating ring member 2*c* is increased. Three cutouts 28 are defined in the outer edge of the flange 27 corresponding to the latch arms 12*c* for facilitating assembly. In this embodiment, the female threads 16 on the annular socket 11*c* and the male threads 25*c* on the macro operating ring member 2*c* constitute the interengaging means, by the action of which axial movement of the macro operating ring member 2*c* and the lens holder 3 relative to the annular socket 11*c* is accomplished, and thus both normal photography and macro photograph can be effected.

In the second and third embodiments as described above, the male threads 25*b*, 25*c* and the female threads 16 that constitute the interengaging means are respectively formed on the outer periphery of the macro operating ring member 2*b*, 2*c* and the inner diameter side of the annular socket 11*b*, 11*c* of the base member 1*b*, 1*c*. However, it should be understood that, the male threads and the female threads may also be respectively formed on the outer periphery of the annular socket 11*b*, 11*c* of the base member 1*b*, 1*c* and the inner diameter side of the macro operating ring member 2*b*, 2*c*.

As is clear from the description of the above three embodiments, the mechanical focal length adjustment device of the present zoom lens assembly only requires four components to accomplish both normal and macro photography, i.e., the base member 1, the macro operating ring member 2, the lens holder 3 and the resilient member 4. Therefore, the present zoom lens assembly is of a simple structure and thus manufacturing costs can be significantly decreased. This compact design also facilitates its wide application to various consuming products such as camera phones, personal digital assistance and digital cameras with a miniaturization design. Further, in accordance with the present invention, zooming and focusing from the normal photography area to the macro photography area is accomplished by rotating a micro operating ring member rather than two cooperative operating members as in the prior art. Accordingly, the operation for focusing and zooming is facilitated and quick focusing can be accomplished.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A zoom lens assembly comprising:
an optical system forming an optical axis and having at least one lens group movable along the optical axis;
a base member;
a macro ring member rotatably engaged with the base member, the macro ring member being movable along the optical axis for a zooming operation and rotatable about the optical axis for a focusing operation;
a driving member responsive to rotation of the macro ring member;
a lens holder received in the macro ring member, the lens holder having said at least one lens group received therein;
a resilient member compressively engaged with the lens holder; and
an interengaging means provided between the macro ring member and the base member;
wherein the macro ring member is movable along the optical axis relative to the base member by the action of the interengaging means.

2. The zoom lens assembly as claimed in claim 1, wherein the base member has a socket defining a plurality of cam slots therein, and the macro ring member has a plurality of outwardly projecting cam pins slidably received in corresponding cam slots, said cam slot and cam pin constituting the interengaging means.

3. The zoom lens assembly as claimed in claim 2, wherein one of the cam pins of the macro ring member projects a further distance than the other cam pins to act as the driving member.

4. The zoom lens assembly as claimed in claim 2, wherein each cam slot of the base member includes a guide portion and opposite first and second slot portions transverse to the guide portion, the guide portion extending in the optical axis direction for guiding insertion of a corresponding cam pin.

5. The zoom lens assembly as claimed in claim 4, wherein each cam slot of the base member has a bottom side composed of a first flat surface corresponding to the first slot portion, a second flat surface corresponding to the second slot portion and an intermediate inclined surface located below the guide portion, the first and second flat surfaces being offset from each other in the optical axis direction.

6. The zoom lens assembly as claimed in claim 5, wherein the second flat surface of said cam slot is at a level higher than the first flat surface in the optical axis direction, and said cam pin of the macro ring member is slidably engagable with the first and second flat surfaces for adjusting focal length of the optical system.

7. The zoom lens assembly as claimed in claim 1, wherein the interengaging means is male threads and female threads formed on the base member and the macro ring member.

8. The zoom lens assembly as claimed in claim 7, wherein the base member has a socket receiving the macro ring member therein, the male threads are formed on the outer periphery of the macro ring member, and the female threads are formed on an inner diameter side of the socket of the base member.

9. The zoom lens assembly as claimed in claim 1, wherein the driving member is a driving pin outwardly projecting from the outer periphery of the macro ring member.

10. The zoom lens assembly as claimed in claim 1, wherein the base member includes a socket having a plurality of latch arms extending therefrom in the optical axis direction, the latch arms having outwardly directed free ends latching with the resilient member.

11. The zoom lens assembly as claimed in claim 10, wherein the resilient member is a belleville spring, the belleville spring including a first ring of a first diameter, a second ring of a second diameter smaller than the first diameter, and a plurality of connecting pieces arranged at equal intervals connecting the first ring to the second ring.

12. The zoom lens assembly as claimed in claim 11, wherein the outwardly directed free ends of the latch arms of the base member latch with the first ring of the belleville spring.

13. The zoom lens assembly as claimed in claim 1, wherein the macro ring member has an annular body and an upper flange having a larger diameter than that of the annular body, the upper flange acting as the driving member.

14. The zoom lens assembly as claimed in claim 13, wherein the upper flange of the macro ring member has serrations formed on an outer edge thereof for facilitating rotation operation.

15. The zoom lens assembly as claimed in claim 13, wherein the base member includes a socket having a plurality of latch arms extending therefrom in the optical axis direction, the latch arms having inwardly directed free ends latching with the resilient member.

16. The zoom lens assembly as claimed in claim 15, wherein the upper flange of the macro ring member defines a plurality of cutouts in an outer edge thereof corresponding to the latch arms of the base member.

17. The zoom lens assembly as claimed in claim 1, wherein the macro ring member and the lens holder are threadably engaged with each other.

18. The zoom lens assembly as claimed in claim 1, wherein the base member includes a base plate and an annular socket formed on the base plate, the base plate defining an opening in the bottom for receiving an image sensing element therein.

19. A zoom lens assembly comprising:
an optical system forming an optical axis and having at least one lens group and an image sensing element;
a base member having the image sensing element received therein;

a macro ring member rotatably engaged with the base member for accomplishing both zooming and focusing operations, the macro ring member having a driving member disposed thereon for manual manipulating;

a lens holder received in the macro ring member, the lens holder having said at least one lens group received therein;

a resilient member compressively engaged with the lens holder; and an interengaging means provided between the macro ring member and the base member;

wherein, when the driving member is manipulated, the macro ring member is rotated and moved along the optical axis relative to the base member by the action of the interengaging means, and thus the focal length of the optical system is varied between a first focal length and a second focal length.

20. A zoom lens assembly comprising:

an optical system forming an optical axis and having at least one lens group;

a base member having a socket, the socket providing a first engaging means;

a macro ring member rotatably engaged with the socket of the base member, the macro ring member having a driving member disposed thereon for manual manipulating and a second engaging means corresponding to the first engaging means;

a lens holder received in the macro ring member, the lens holder having said at least one lens group received therein; and a resilient member compressively engaged with the lens holder;

wherein, when the driving member is manipulated, the first and second engaging means are slidably engaged with each other, and the macro ring member is actuated by the action of the first and second engaging means to be rotated and moved along the optical axis relative to the base member for accomplishing both zooming and focusing operations.

* * * * *